United States Patent Office 2,840,996
Patented July 1, 1958

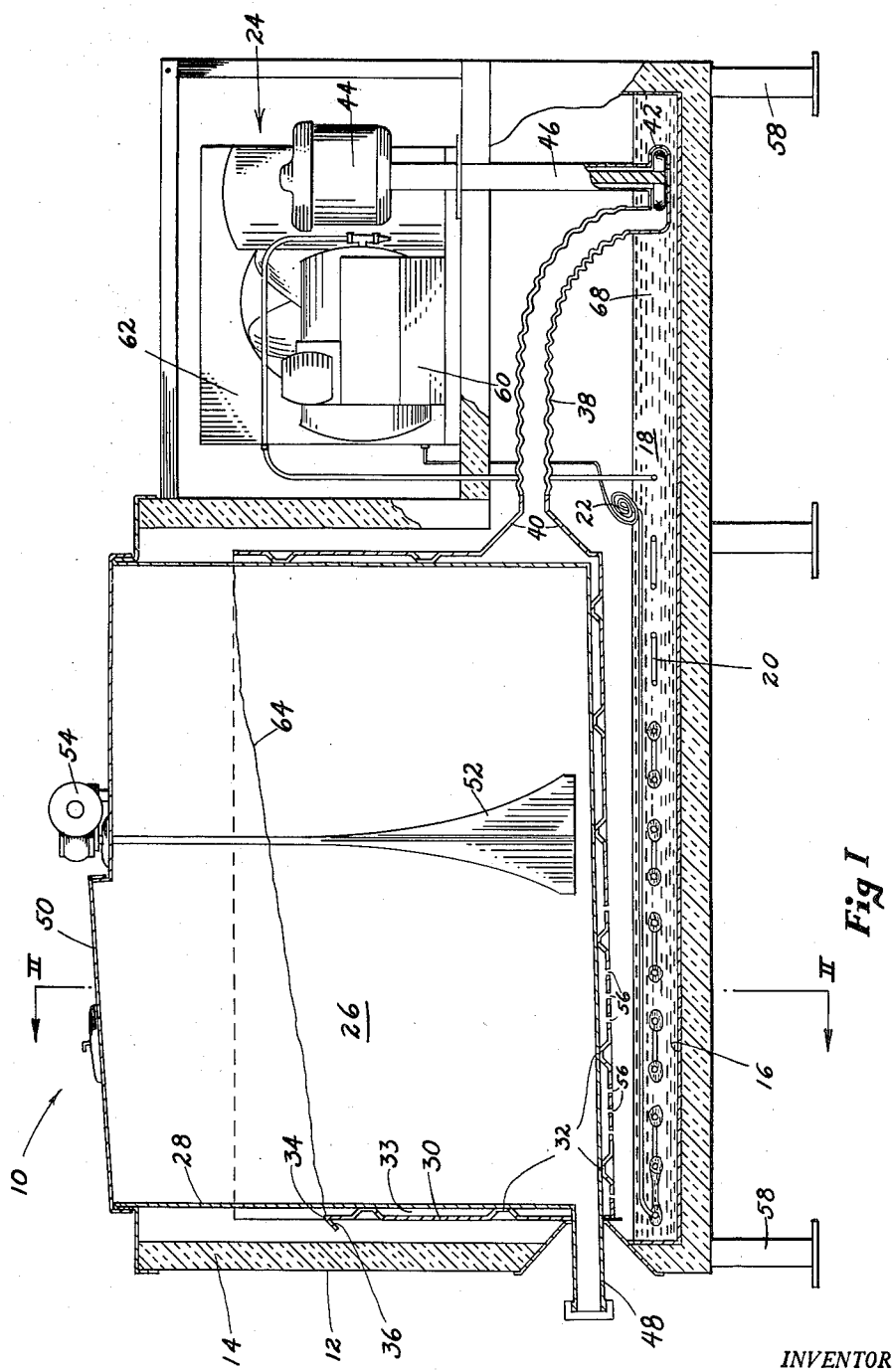
Fig I

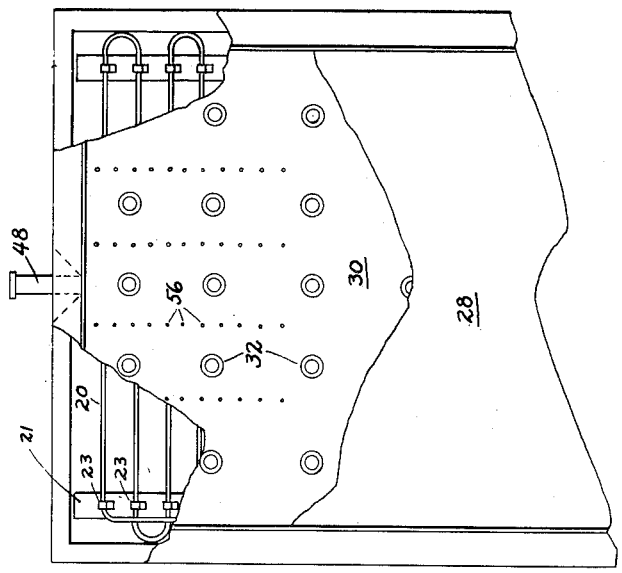
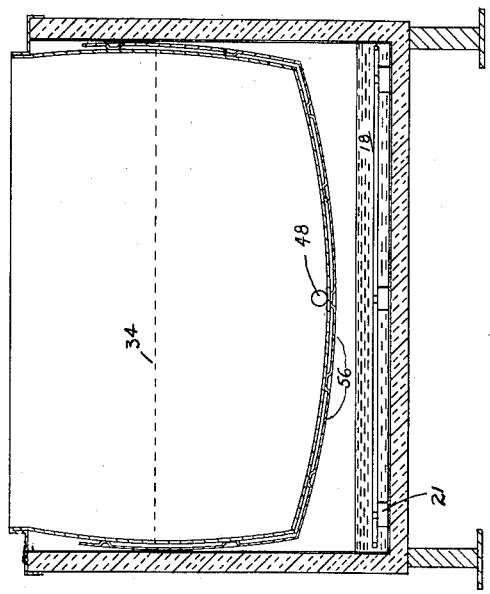

2,840,996

MILK COOLER

Theodore R. Steinhorst and Henry W. Steinhorst, Utica, N. Y., assignors to Emil Steinhorst & Sons, Inc., Utica, N. Y.

Application January 11, 1955, Serial No. 481,189

11 Claims. (Cl. 62—185)

This invention relates to milk coolers and more particularly to bulk milk coolers of the indirectly refrigerated type.

Generally, bulk milk coolers have heretofore consisted of the direct expansion type wherein the milk is cooled directly by the gaseous refrigerant and the water cooled type where water is cooled by a refrigerating system and then circulated about the milk to cool it. The latter type have, in turn, consisted of those wherein the bottom of the milk vessel is submerged in the water and additional cooling obtained by spraying water down the sides of the milk vessel and those wherein the only cooling is that obtained by spraying the water down the sides of the milk vessel which is positioned well above the water level in the sump.

The submerged type, while providing good cooling qualities, particularly for small quantities of milk, was extremely difficult to clean since the inner surface of the milk vessel could not be heated sufficiently to permit removal of the fatty portions of the milk that when cooled adhered thereto. The non submerged type permitted thorough cleaning but provided inferior cooling properties, particularly when only a small amount of milk was placed in the vessel.

According to the present invention we have overcome the disadvantages of both the types of indirect coolers heretofore known and have provided a new and superior water cooled bulk milk cooler by circulating a thin layer of water over a substantially larger surface of the milk vessel, only when cooling is desired.

It is an object of the present invention to provide a water cooled milk cooler that will efficiently cool any quantity of milk within the rated capacity and yet can be readily cleaned to the highest standards of sanitation. It is another object to provide a water cooled bulk milk cooler that may be readily cleaned with hot water. It is another object to provide a water cooled type bulk milk cooler wherein the temperature of the milk therein may be accurately controlled within very narrow limits. It is another object to provide a milk cooler of the bulk water cooled type wherein casein separation is eliminated for all practical purposes. It is another object to provide a water cooled bulk type milk cooler wherein warm milk placed therein can be quickly and easily brought to a desired cool temperature and maintained substantially constant at that temperature. It is a still further object to provide a water cooled bulk type milk cooler that is substantially free from condensation on the inner surfaces thereof. These and other and further objects will be in part apparent and in part pointed out as the specification proceeds.

In the drawings:

Figure 1 is a side elevation partially in section, on an exaggerated scale, of the milk cooler according to the present invention.

Figure 2 is a sectional view taken on line II—II of Figure 1.

Figure 3 is a top plan view partially broken away to show the inner surface of the jacket and the position of the cooling coil.

Referring now to Figure 1 the cooler 10 comprises generally an outer cabinet 12 which is insulated as at 14 and extends along the sides, bottom and a portion of the top of the sump of the cooling section of the cooler 10. The bottom of cabinet 12 is lined with a metal or other water-proof material 16 to form a sump tank 18 for the cooling water to cool the milk containing chamber. Mounted within sump tank 18 is evaporator coil 20 which is connected through capillary tube 22 to refrigerating mechanism 24 which is mounted outside of cabinet 12. As may be seen in Figures 2 and 3 coil 20 is mounted on channels 21 by clips 23 and extends from wall to wall of sump 18 so as to form a substantially solid ice cake throughout the cooling zone to promote efficient cooling as will be described herein.

Mounted above coil 20 is milk chamber or vessel 26 which comprises an inner liner 28 suspended on the top edge of cabinet 12 and an outer jacket 30 which extends about the lower two-thirds of the sides and the bottom of liner 28. Jacket 30 is held about liner 28 by tie members 32 which are spaced throughout the surfaces thereof at appropriate intervals. Jacket 30 is held about one-quarter of an inch away from liner 28 to provide a passageway 33 for the circulation of cooling water about milk chamber 26. As shown in Figure 1 this dimension is exaggerated somewhat to clearly show the construction. Tie members 32 are approximately one and one half inches in diameter at jacket 30 and three quarters of an inch in diameter at liner 28. Ties 32 are stamped in jacket 30 and are soldered, gas welded or otherwise secured to liner 28 so as to cause a minimum disfiguration of the inner surface of liner 28.

As may be seen in Figure 1, jacket 30 has its left end cut off somewhat lower than its sides and other end. This extends across the whole width of the end of chamber 26 (see Figure 3) and forms a discharge dam 34 over which the water circulated in passageway 33 may be discharged. A spillway 36 is provided along dam 34 to prevent water discharged thereover from running down the end and along the bottom of the outer surface of jacket 30. This causes the overflowing water to drop directly onto the end of the ice cake.

A water inlet is provided adjacent the bottom of the right end of jacket 30, Figure 1, which is flared at 40 from the input pipe 38 to the jacket 30 to permit a sufficient volume of water to enter passageway 33. Pipe 38 is connected to pump 42 positioned in sump 18 which is driven by motor 44 through shaft 46. Motor 44 is mounted outside cabinet 12 along with refrigerating system 24.

Jacket 30 is also provided adjacent the left end thereof with a series of small diameter "weeper" holes 56 in the bottom surface (see Figure 3). In one embodiment a diameter of one-eighth of an inch has been found to be satisfactory. These weepers have a dual function—aiding in exposing additional cooling surface on the ice cake and emptying the passageway 33 of water when circulation is stopped—both contributing toward the efficiency and superiority of the present cooler as will be explained herein.

Liner 28 tilts downwardly to the left in Figure 1 to a discharge spout 48 which is positioned at the center of the end so that together with the curved bottom (Figure 2) complete drainage of the milk therein is obtained. Any suitable valve may be employed on spout 48 and an easily removable cover 50 is provided to close the top of chamber 26. Also as may be seen in Figure 1, an agitator 52 driven by motor 54 may be provided if desired. The entire cabinet 12 may be mounted on legs 58.

Refrigerating system 24 consists of the conventional motor-compresser 60 and condenser 62 together with appropriate headers, receivers, etc. and controls. These are mounted on cabinet 12 above pump 42 and enclosed by any suitable framing and panels.

In operation when it is desired to cool a quantity of milk placed in chamber 26 the apparatus is turned on which causes both the refrigerating system 24, the pump 42 and agitator 52 to operate. Water which has previously been placed in sump 18 is picked up by pump 42, and circulated through pipe 38, passageway 33 and over dam 34 and spillway 36. The water then falls down onto the ice cake built up about coil 20 and flows the full length thereof back to the pump 42. Advantageously, the water is circulated at a high rate such that it picks up the maximum heat possible from chamber 26 by the time it reaches dam 34. Due to this high volume the water assumes a level in passageway 33 approaching that shown by line 64, Figure 1. To obtain maximum advantage from this high rate of circulation of cooling water, agitator 52 circulates the milk in chamber 26 so that a new layer of milk is continually brought into contact with the cooled liner 28. A very rapid and complete cooling of any milk in vessel 26 is thus obtained.

Gradually, as the cooling operation continues the circulated water works around the ice cake about coil 20 and eventually flows back toward pump 42 along both the top and bottom. This, together with the wide dam 34, increases the cooling efficiency of the system since the water is circulated over substantially the entire surface of both sides of the ice cake. Weepers 56 also aid in this as a small amount of water necessarily flows through them at all times and drops down onto the ice cake, tending to break it up somewhat and increase the surface area thereof.

The cooling is continued until the desired temperature is reached as indicated by a thermostatic bulb (not shown) which may be set to automatically turn off refrigerating system 24, pump 42, and agitator 52. Within about five minutes after the circulation of the water is stopped, weepers 56 will drain off all the water in passageway 33. Since, as is clearly shown in Figure 1, the bottom of jacket 30 is well above the water level 68 in sump 18, this eliminates sub-cooling of the milk adjacent the surface of liner 28. Thus the temperature may be set for 38° F. and all the milk will be held within a degree or two thereof. This is important because it has been found that at temperatures of about 36° F. and below, a casein separation is incurred in milk which causes flaking and generally renders the milk less desirable. According to the present invention, we have completely eliminated this problem so often encountered in prior art devices.

In addition, since the weepers 56 automatically drain the cold water from passageway 33 quickly, the interior surface of liner 28 may be easily cleaned with hot water. Heretofore, where the cooling water has remained in contact with the milk chamber, it has been almost impossible to completely remove all the fatty components of the milk from the chilled surfaces during cleaning. This has resulted in perturbing high bacteria counts in the milk despite the most prompt refrigeration. This problem has been completely eliminated in the present invention.

Further, with the cooling water completely surrounding the milk vessel 26 throughout the cooling operation a very efficient cooling of even the smallest amount of milk is obtained. There is no danger of the thermostat indicating a cooled condition and the milk still being warm. Also, the problem of condensation, when the milk vessel 26 is largely empty, has been substantially eliminated since the walls are maintained in a cold condition for only a very short time.

From the foregoing, it can be readily seen that a very efficient bulk milk cooler has been provided that is not subject to defects of the prior art and which cools milk placed therein quickly and positively. For instance, it has been found that with ten gallons of warm milk (98° F.) added each ten minutes, the milk of each batch may be brought to 40° F. temperature in a minute or two and an entire tank of one hundred gallons may be brought from body temperature (98° F.) to 40° F. in two hours.

While there is given above a certain specific example of this invention and its application in practical use, it should be understood that this is not intended to be exhaustive or to be limiting of the invention. On the contrary, this illustration and explanation herein are given in order to acquaint others skilled in the art with this invention and the principles thereof and a suitable manner of its application in practical use, so that others skilled in the art may be enabled to modify the invention and to adapt and apply it in numerous forms each as may be best suited to the requirement of a particular use.

We claim:

1. Apparatus for cooling milk of the water cooled, bulk milk cooler type which comprises, an outer cabinet having insulated walls and bottom, a sump tank positioned in the bottom of said cabinet, an evaporator coil of a refrigerating system positioned adjacent the bottom of said sump tank, a stainless steel cylindraform milk tank liner open at the top and mounted in said cabinet so that the bottom thereof is above the water level in said sump tank, an outer shell surrounding the lower portion of said liner and spaced closely adjacent thereto, a plurality of weeper holes positioned in the bottom of said shell adjacent one end thereof, a plurality of tie members disposed between said liner and shell to join said outer shell to said liner, flared water inlet means for introducing water between said liner and shell, an overflow dam member positioned along one end of said shell to permit discharge of water from between said shell and liner into said sump tank, pump means for circulating water from said sump through said inlet means and out said overflow dam and back to said sump tank, refrigerating means connected to said evaporator coil for cooling the water in said sump, and control means for regulating the temperature and flow of said water.

2. A water cooled bulk type milk cooler comprising an insulated outer cabinet open on at least a portion of the top, a sump tank positioned throughout the bottom of said cabinet, a milk receiving vessel mounted in said cabinet with the bottom thereof extending downwardly to a point above the level of water in said sump tank, an outer jacket spaced from and surrounding the lower portion of said vessel said jacket being above the level of water in said sump, a plurality of tie members securing said jacket to said vessel to prevent excessive separation thereof, inlet and outlet openings in said jacket, pump means for circulating water from said sump through the space between said vessel and jacket at a high velocity, and refrigerating means for the water in said sump.

3. Apparatus for cooling milk of the type utilizing an indirect cooling system comprising in combination an inner vessel adapted to receive milk therein, a cooling jacket positioned about the lower portion of said vessel and spaced closely adjacent thereto, inlet and outlet openings in said jacket, a sump tank positioned below said vessel and jacket, said sump tank containing therein a supply of cooling medium at a level below the bottom of said jacket, pump means operatively connected to said inlet for rapidly circulating said cooling medium from said sump through said jacket and back to said sump, an evaporator coil positioned in said sump to cool said cooling medium, said coil being positioned relative to said inlet and outlet openings in said jacket so that the discharged cooling medium travels substantially the entire length of said coil before being recirculated and said outlet opening having a broad spillway to discharge said cooling medium so that it flows over substantially the entire width of said coil as it is recirculated whereby a maximum cooling efficiency is obtained.

4. A water cooled bulk type milk cooler comprising an outer cabinet open on at least a portion of the top and having the walls and bottom thereof insulated, a sump tank positioned in the bottom of said cabinet, refrigerating means mounted on said cabinet outside said insulated portion, an evaporator coil for said refrigerating system mounted in said sump tank adjacent the bottom thereof, a milk receiving vessel mounted in said cabinet above said coil so that the bottom thereof does not extend into said sump tank, an outer jacket surrounding the lower portion of said vessel, a plurality of tie members holding said jacket closely adjacent but spaced from contact with said vessel, one end of said jacket being lower than the sides and other end to form a discharge dam for water circulated between said vessel and jacket, water inlet means positioned in the other end of said jacket adjacent the bottom thereof for introducing water between said vessel and jacket, pump means operatively connected to said inlet for circulating water at a rapid rate from said sump to said jacket and back again, a spillway flange mounted along said discharge dam to cause the water discharged therefrom to fall down and onto said evaporator coil and to traverse the full length and width thereof, a discharge spout extending from said milk receiving vessel through said jacket and cabinet to permit discharge of milk therefrom and a removable cover for selectively closing the open top of said cabinet to keep any milk in said vessel clean and free from external dirt while permitting ready access for pouring milk into said vessel.

5. A water cooled bulk type milk cooler comprising an outer insulated cabinet; an inner stainless steel liner open at the top and having a discharge spout adjacent the bottom of one end; a heat exchange jacket mounted about the lower portion of said liner to form a thin passageway for the circulation of water about said liner; a sump tank formed in the bottom of said cabinet below said liner and jacket; a cooling coil positioned in said sump extending substantially the entire length and width below said liner; pump means for circulating water from said sump through said passageway, over the cooling coil and back to said pump; and a plurality of weeper holes positioned in the bottom of said jacket whereby said jacket will automatically empty of cold water upon stopping of a cooling cycle to prevent casein separation in the milk and facilitate cleaning of the liner.

6. A device as described in claim 5 wherein said liner and jacket are sloped toward the discharge end thereof and said weeper holes are positioned adjacent said discharge end to facilitate drainage and insure automatic emptying of cold water from said jacket.

7. A device as described in claim 6 wherein said jacket has a discharge opening comprising an end wall having its upper edge lower than the other walls and an outwardly extending flange attached thereto to prevent overflowing water from running down the outer surface of the jacket along the bottom thereof.

8. A device as described in claim 7 wherein said discharge opening is positioned at the lower end of said jacket and said pump means is positioned at the other end of said liner and jacket.

9. A device as described in claim 8 wherein said jacket is held to said liner at a distance therefrom of one quarter of an inch by a plurality of tie members spaced about the surface thereof.

10. A water cooled bulk type milk cooler comprising an insulated outer cabinet open on at least a portion of the top, a sump tank positioned throughout the bottom of said cabinet, a milk receiving vessel mounted in said cabinet with the bottom thereof extending downwardly to a point adjacent to but above the level of water in said sump tank, an outer jacket spaced from and surrounding the lower portion of said vessel, said jacket being above the level of water in said sump, a plurality of tie members securing said jacket to said vessel to prevent excessive separation thereof, inlet and outlet openings in said jacket, pump means operatively connected to said inlet for circulating water from said sump through the space between said vessel and jacket at a high velocity, a plurality of weeper holes positioned in the bottom of said outer jacket, the diameter of said weeper holes being such that during circulation of water between said jacket and container very little water escapes therethrough but being of sufficient diameter to permit complete drainage of all cooling water from said jacket upon lack of circulation, and refrigerating means for the water in said sump.

11. A water cooled bulk type milk cooler comprising an outer insulated cabinet; an inner liner open at the top and having a discharge spout adjacent the bottom of one end; a heat exchange jacket mounted about the lower portion of said liner to form a thin passageway for the circulation of water about said liner; a sump tank formed in the bottom of said cabinet below said liner and jacket; a cooling coil positioned in said sump; pump means for circulating water from said sump through said passageway, over the cooling coil and back to said pump; and discharge means positioned in said jacket to empty it of cold water upon stopping of a cooling cycle whereby casein separation in the milk is prevented and cleaning of the liner is facilitated.

References Cited in the file of this patent

UNITED STATES PATENTS

| | | |
|---|---|---|
| 2,252,173 | Gibson | Aug. 12, 1941 |
| 2,661,607 | Markley | Dec. 8, 1953 |
| 2,690,061 | Markley | Sept. 28, 1954 |
| 2,703,966 | Snelson | Mar. 15, 1955 |